(12) United States Patent
Chang et al.

(10) Patent No.: US 10,782,435 B2
(45) Date of Patent: Sep. 22, 2020

(54) DETECTION DEVICE

(71) Applicant: Acer Incorporated, New Taipei (TW)

(72) Inventors: Kun-Sheng Chang, New Taipei (TW); Ching-Chi Lin, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 56 days.

(21) Appl. No.: 16/170,281

(22) Filed: Oct. 25, 2018

(65) Prior Publication Data

US 2020/0064509 A1 Feb. 27, 2020

(30) Foreign Application Priority Data

Aug. 21, 2018 (TW) .............................. 107129116 A

(51) Int. Cl.
*G01V 3/08* (2006.01)
*H01F 17/00* (2006.01)
*H04B 17/10* (2015.01)
*H01Q 1/22* (2006.01)

(52) U.S. Cl.
CPC ......... *G01V 3/088* (2013.01); *H01F 17/0013* (2013.01); *H01Q 1/2266* (2013.01); *H04B 17/102* (2015.01); *H01F 2017/002* (2013.01); *H01F 2017/0073* (2013.01)

(58) Field of Classification Search
CPC .............. G01V 3/088; H01F 17/0013; H01F 2017/0073; H01F 2017/002; H04B 17/102; H01Q 1/2266
USPC ................................................ 324/235, 457
See application file for complete search history.

(56) References Cited

U.S. PATENT DOCUMENTS

| 9,680,202 | B2 | 6/2017 | Irci et al. |
| 9,893,715 | B2 | 2/2018 | Zachara |
| 2015/0270619 | A1 | 9/2015 | Zhu et al. |
| 2018/0088728 | A1* | 3/2018 | Wurzel .................. G06F 3/044 |

FOREIGN PATENT DOCUMENTS

| TW | 201509267 A | 3/2015 |
| TW | 201528611 A | 7/2015 |
| WO | 2013137892 A1 | 9/2013 |

OTHER PUBLICATIONS

Office Action dated Jul. 17, 2019, Application No. # 107129116, pp. 1-6.

* cited by examiner

*Primary Examiner* — Farhana A Hoque
(74) *Attorney, Agent, or Firm* — McClure, Qualey & Rodack, LLP

(57) ABSTRACT

A detection device includes a spiral structure, a proximity sensor, a via element, an electrostatic-field enhancement element, and a nonconductive substrate. The spiral element has a first end and a second end. The proximity sensor is coupled to the first end of the spiral element. The electrostatic-field enhancement element is disposed adjacent to the spiral structure. The first end of the spiral structure is coupled through the via element to the electrostatic-field enhancement element. The second end of the spiral structure is an open end. The electrostatic-field enhancement element is configured to increase the directivity of the detection device. The nonconductive substrate is disposed between the spiral structure and the electrostatic-field enhancement element. The via element penetrates the nonconductive substrate.

7 Claims, 5 Drawing Sheets

DETECTION DEVICE

CROSS REFERENCE TO RELATED APPLICATIONS

This application claims priority of Taiwan Patent Application No. 107129116 filed on Aug. 21, 2018, the entirety of which is incorporated by reference herein.

BACKGROUND OF THE INVENTION

Field of the Invention

The disclosure generally relates to a detection device, and more particularly, to a detection device for increasing a detectable distance.

Description of the Related Art

With the advancements being made in mobile communication technology, mobile devices such as portable computers, mobile phones, multimedia players, and other hybrid functional portable electronic devices have become more common. To satisfy user demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi and Bluetooth systems and using frequency bands of 2.4 GHz, 5.2 GHz, and 5.8 GHz.

An antenna element is an essential component of a mobile device for wireless communication. In order to meet the requirements of SAR (Specific Absorption Rate) set by the government, designers may control the RF (Radio Frequency) power relative to the antenna element by incorporating a proximity sensor (P-sensor) into the mobile device. However, the shape of the sensing pad of the proximity sensor is limited by the surrounding elements, and this reduces the detectable distance of the proximity sensor. As a result, there is a need to propose a novel solution so as to overcome the problems of the prior art.

BRIEF SUMMARY OF THE INVENTION

In a preferred embodiment, the invention is directed to a detection device that includes a first spiral structure, a proximity sensor, a first via element, a first electrostatic-field enhancement element, and a first nonconductive substrate. The first spiral structure has a first end and a second end. The first electrostatic-field enhancement element is disposed adjacent to the first spiral structure. The first end of the first spiral structure is coupled through the first via element to the first electrostatic-field enhancement element. The second end of the first spiral structure is an open end. The first electrostatic-field enhancement element is configured to increase the directivity of the detection device. The first nonconductive substrate is disposed between the first spiral structure and the first electrostatic-field enhancement element. The first via element penetrates though the first nonconductive substrate.

In some embodiments, the first electrostatic-field enhancement element is a first metal plane.

In some embodiments, the line width of the first spiral structure is from 0.3 mm to 0.5 mm.

In some embodiments, the distance between any two adjacent conductive lines of the first spiral structure is shorter than or equal to 0.3 mm.

In some embodiments, the first spiral structure is substantially parallel to the first electrostatic-field enhancement element. The distance between the first spiral structure and the first electrostatic-field enhancement element is shorter than 2 mm.

In some embodiments, the vertical projection of the first spiral structure is completely inside the first electrostatic-field enhancement element.

In some embodiments, the detection device further includes a second spiral structure, a second via element, a second electrostatic-field enhancement element, and a second nonconductive substrate. The second spiral structure has a first end and a second end. The second electrostatic-field enhancement element is disposed adjacent to the second spiral structure. The first end of the second spiral structure is coupled through the second via element to the second electrostatic-field enhancement element. The second end of the second spiral structure is an open end. The second nonconductive substrate is disposed between the second spiral structure and the second electrostatic-field enhancement element. The second via element penetrates though the second nonconductive substrate.

In some embodiments, the second electrostatic-field enhancement element is a second metal plane.

In some embodiments, the detection device further includes a connection element coupled between the first end of the first spiral structure and the first end of the second spiral structure.

In some embodiments, a non-metal notch region is defined by the first spiral structure, the second spiral structure, and the connection element, and a vertical projection of an antenna element is completely inside the non-metal notch region, so that the radiation pattern of the antenna element is not negatively affected by the detection device.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
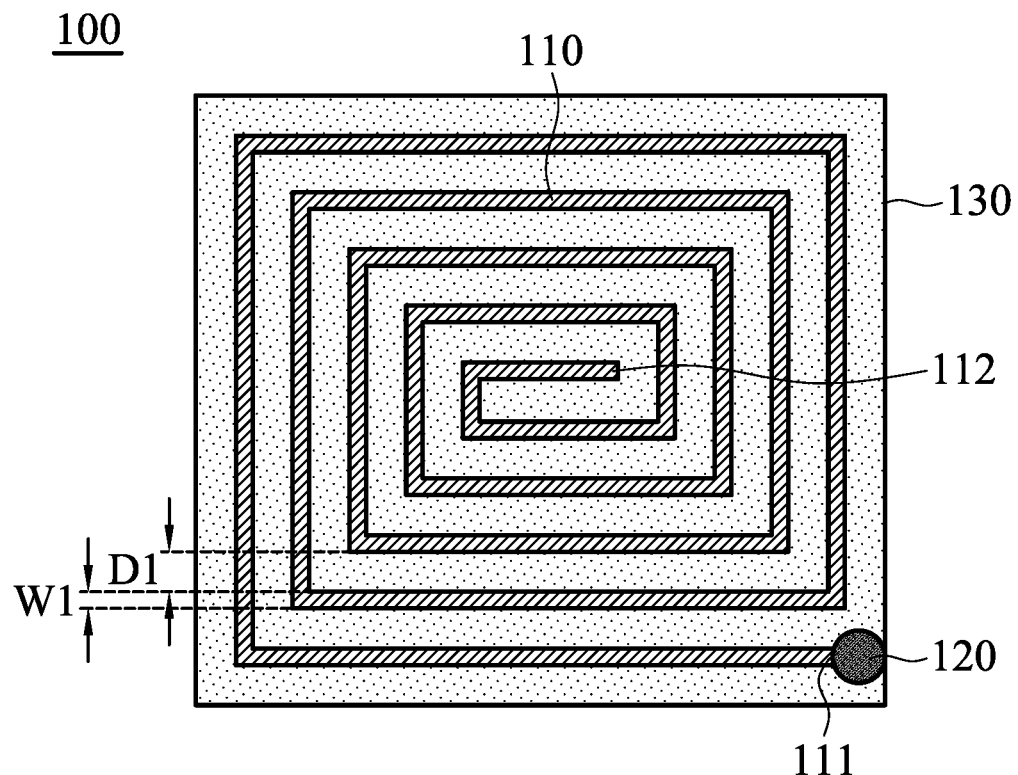
FIG. 1 is a top view of a detection device according to an embodiment of the invention.

FIG. 1 is a top view of a detection device 100 according to an embodiment of the invention. The detection device 100 is applicable to a mobile device such as a smartphone, a tablet computer, or a notebook computer. As shown in FIG. 1, the detection device 100 at least includes a first spiral structure 110, a first via element 120, and a first electrostatic-field enhancement element 130. In some embodiments, the first spiral structure 110, the first via element 120, and the first electrostatic-field enhancement element 130 are all made of metal materials, such as copper, silver, aluminum, iron, or their alloys.

The first electrostatic-field enhancement element 130 is disposed adjacent to the first spiral structure 110. In some embodiments, the first electrostatic-field enhancement element 130 is a first metal plane. It should be noted that the term "adjacent" or "close" over the disclosure means that the distance (spacing) between two corresponding elements is smaller than a predetermined distance (e.g., 5 mm or the shorter), or means that the two corresponding elements directly touch each other (i.e., the aforementioned distance/spacing therebetween is reduced to 0). The first spiral structure 110 has a first end 111 and a second end 112. The first end 111 of the first spiral structure 110 is coupled through the first via element 120 to the first electrostatic-field enhancement element 130. The second end 112 of the first spiral structure 110 is an open end. Specifically, the first end 111 of the first spiral structure 110 may be positioned at the outermost periphery of the first spiral structure 110, and the second end 112 of the first spiral structure 110 may be positioned at the central point of the first spiral structure 110. The first spiral structure 110 has a vertical projection on the first electrostatic-field enhancement element 130, and the whole vertical projection may be inside the first electrostatic-field enhancement element 130. In other words, the total area of the first spiral structure 110 is smaller than or equal to the total area of the first electrostatic-field enhancement element 130.

With respect to the operation principles, a combination of the first spiral structure 110, the first via element 120, and the first electrostatic-field enhancement element 130 is considered as a compound sensing pad. The design of the first spiral structure 110 causes the currents thereon to flow through a single path, so as to solve the problem of current divergences on a conventional sensing pad. The first electrostatic-field enhancement element 130 is configured to increase the directivity of the detection device 100. In addition, according to practical measurement, if the first end 111 of the first spiral structure 110 is coupled through the first via element 120 to the first electrostatic-field enhancement element 130, such a design can improve the performance of the first electrostatic-field enhancement element 130, so as to significantly increase a detectable distance of the detection device 100. For example, the detectable distance of the detection device 100 may be about 15 mm, but it is not limited thereto.

In some embodiments, the element sizes and element settings of the detection device 100 are as follows. The number of coil turns of the first spiral structure 110 may be greater than or equal to 3. The line width W1 of the first spiral structure 110 may be from 0.3 mm to 0.5 mm. The distance D1 between any two adjacent conductive lines of the first spiral structure 110 may be shorter than or equal to 0.3 mm. The length of the first electrostatic-field enhancement element 130 may be shorter than or equal to 10 mm. The width of the first electrostatic-field enhancement element 130 may be shorter than or equal to 10 mm. The above ranges of parameters are calculated and obtained according to many experiment results, and they help to maximize the detectable distance of the detection device 100.

Figure 2:
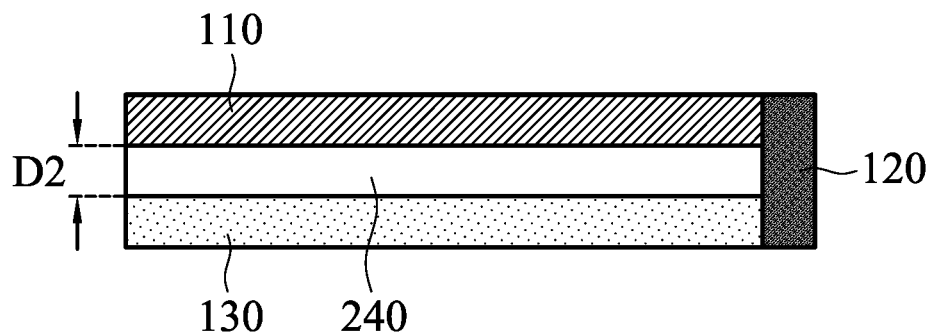
FIG. 2 is a sectional view of a detection device according to an embodiment of the invention.

FIG. 2 is a sectional view of a detection device 200 according to an embodiment of the invention. FIG. 2 is similar to FIG. 1. In the embodiment of FIG. 2, the detection device 200 further includes a first nonconductive substrate 240. For example, the first nonconductive substrate 240 may be an FR4 (Flame Retardant 4) substrate or a plastic substrate. The first nonconductive substrate 240 is disposed between the first spiral structure 110 and the first electrostatic-field enhancement element 130. The first spiral structure 110 may be affixed onto the first nonconductive substrate 240. The first via element 120 may penetrate though the first nonconductive substrate 240, and the first via element 120 may be coupled between the first spiral structure 110 and the first electrostatic-field enhancement element 130. The first spiral structure 110, the first nonconductive substrate 240, and the first electrostatic-field enhancement element 130 may be substantially parallel to each other. The distance D2 between the first spiral structure 110 and the first electrostatic-field enhancement element 130 (or the thickness of the first nonconductive substrate 240) may be shorter than 2 mm, so as to improve the performance of the first electrostatic-field enhancement element 130. Other features of the detection device 200 of FIG. 2 are similar to those of the detection device 100 of FIG. 1. Accordingly, the two embodiments can achieve similar levels of performance.

Figure 3:
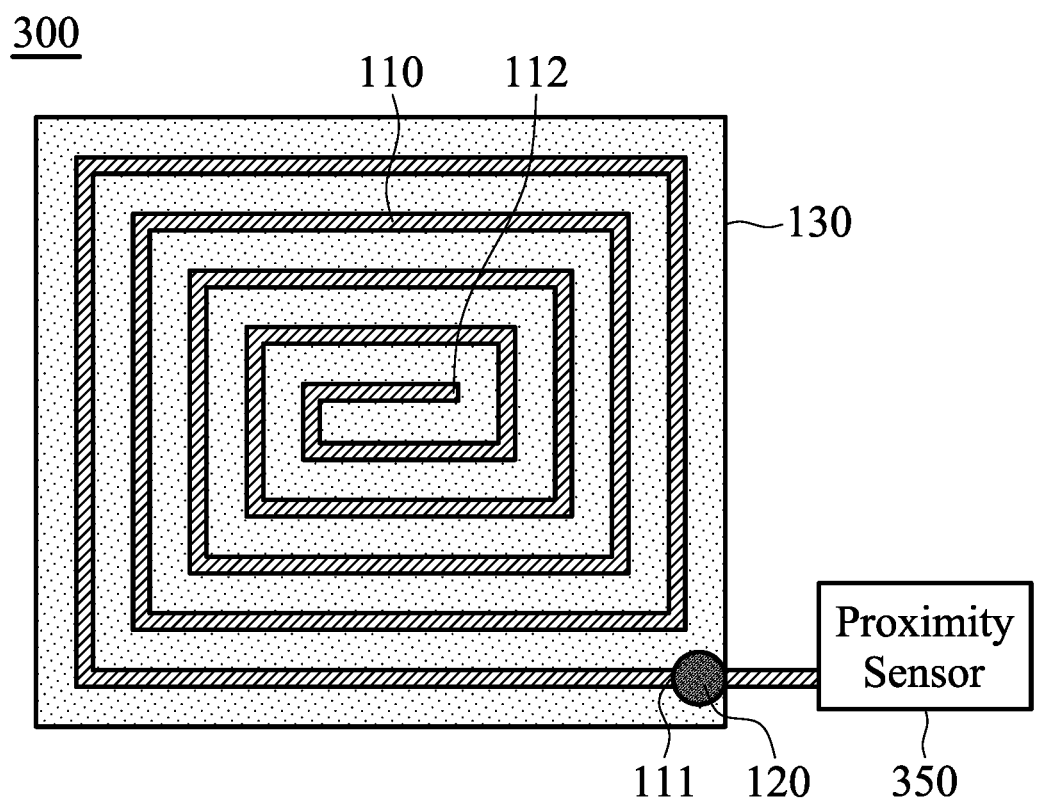
FIG. 3 is a top view of a detection device according to an embodiment of the invention.

FIG. 3 is a top view of a detection device 300 according to an embodiment of the invention. FIG. 3 is similar to FIG. 1. In the embodiment of FIG. 3, the detection device 300 further includes a proximity sensor (P-sensor) 350. The proximity sensor 350 is coupled to the first end 111 of the first spiral structure 110 and the first via element 120. The proximity sensor 350 can use the compound sensing pad formed by the first spiral structure 110, the first via element 120, and the first electrostatic-field enhancement element 130 to detect any nearby conductive element. For example, an effective capacitor may be formed between the compound sensing pad and the conductive element. The proximity sensor 350 can estimate the distance between the compound sensing pad and the conductive element by analyzing the capacitance of the effective capacitor. Other features of the detection device 300 of FIG. 3 are similar to those of the detection device 100 of FIG. 1. Accordingly, the two embodiments can achieve similar levels of performance.

Figure 4:
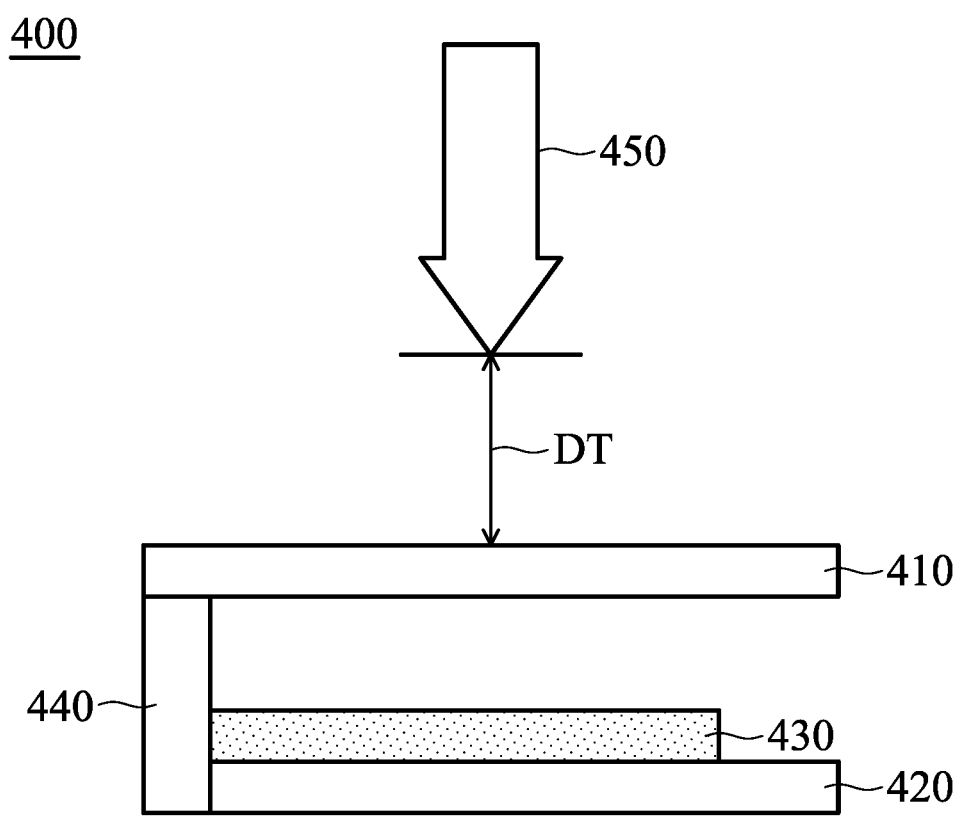
FIG. 4 is a side view of a mobile device according to an embodiment of the invention.

FIG. 4 is a side view of a mobile device 400 according to an embodiment of the invention. In the embodiment of FIG. 4, the mobile device 400 is a notebook computer which at least includes a base housing 410, a keyboard frame 420, an antenna element 430, and an edge element 440. The edge element 440 is connected between the keyboard frame 420 and the base housing 410. It should be understood that the keyboard frame 420 and the base housing 410 are equivalent to the so-called "C component" and "D component" of the notebook computer, respectively. The antenna element 430 is disposed adjacent to the keyboard frame 420. The aforementioned detection device 100 (or 200 or 300) is disposed inside the base housing 410. When an SAR (Specific Absorption Rate) testing procedure is performed to the mobile device 400, a measurement probe 450 transmits its full power to the base housing 410. The maximum distance between the measurement probe 450 and the base housing 410 is considered as a detectable distance DT of the detection device 100 on the condition that the detection device 100 can detect the measurement probe 450. However, the invention is not limited thereto. In other embodiments, the detectable distance DT means the maximum distance between the compound sensing pad of the detection device 100 (or 200 or 300) and any conductive element under test (e.g., a metal element or a human body), and within the maximum distance, the detection device 100 can easily find the existence of the conductive element under test.

Figure 5A:
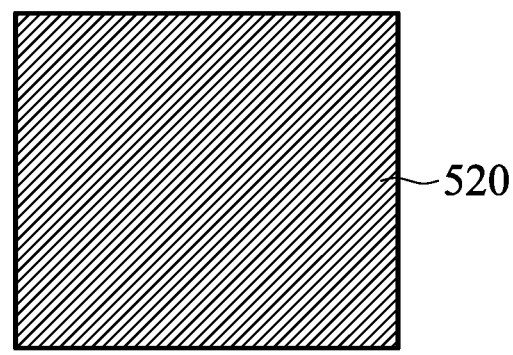
FIG. 5A is a top view of a conventional sensing pad.

FIG. 5A is a top view of a conventional sensing pad 520. The conventional sensing pad 520 has a complete rectangular shape. According to practical measurements, because the currents on the conventional sensing pad 520 are divergent and flow in different directions, the corresponding detection device usually has a short detectable distance, such as only 11 mm.

Figure 5B:
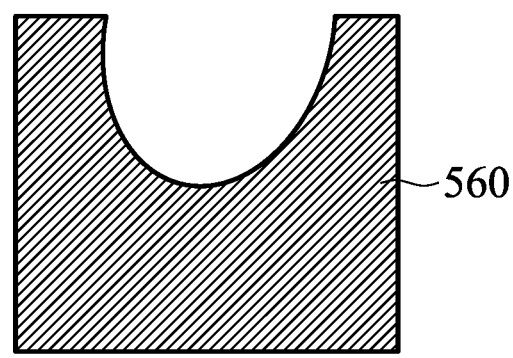
FIG. 5B is a top view of another conventional sensing pad.

FIG. 5B is a top view of another conventional sensing pad 560. The conventional sensing pad 560 has an incomplete rectangular shape. A notch of the conventional sensing pad 560 is occupied by other components of the mobile device. According to practical measurements, because the currents on the conventional sensing pad 560 are divergent and flow in different directions and the total area of the conventional sensing pad 560 is too small, the corresponding detection device usually has a shorter detectable distance, such as shorter than 10 mm.

Figure 6:
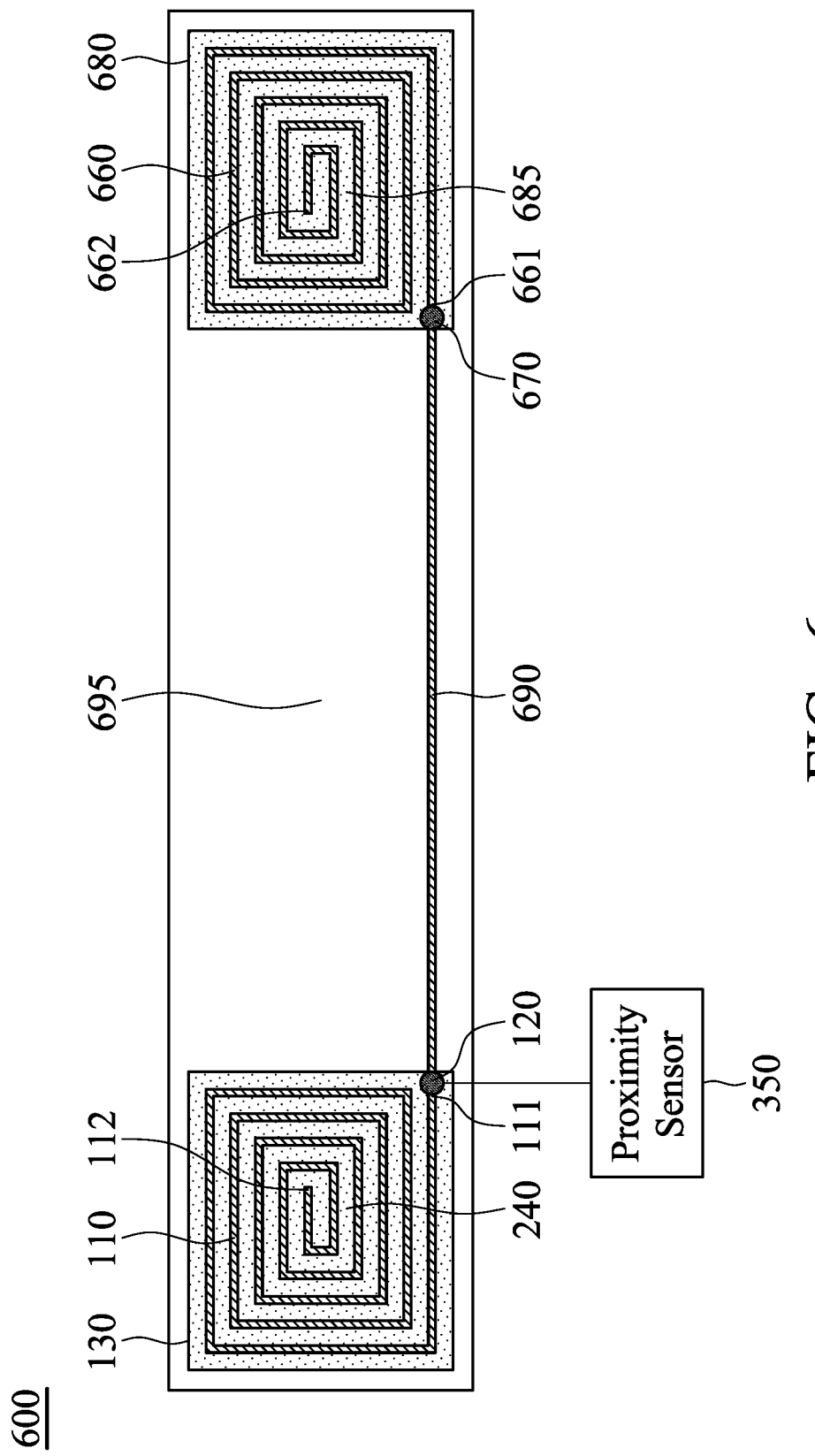
FIG. 6 is a top view of a detection device according to an embodiment of the invention.

FIG. 6 is a top view of a detection device 600 according to an embodiment of the invention. FIG. 6 is similar to FIG. 1, FIG. 2, and FIG. 3. In the embodiment of FIG. 6, the detection device 600 further includes a second spiral structure 660, a second via element 670, a second electrostatic-field enhancement element 680, a second nonconductive substrate 685, and a connection element 690. The second spiral structure 660, the second via element 670, the second electrostatic-field enhancement element 680, and the connection element 690 are all made of metal materials. The second electrostatic-field enhancement element 680 is disposed adjacent to the second spiral structure 660. In some embodiments, the second electrostatic-field enhancement element 680 is a second metal plane. The second spiral structure 660 has a first end 661 and a second end 662. The first end 661 of the second spiral structure 660 is coupled through the second via element 670 to the second electrostatic-field enhancement element 680. The second end 662 of the second spiral structure 660 is an open end. The first end 661 of the second spiral structure 660 may be positioned at the outermost periphery of the second spiral structure 660. The second end 662 of the second spiral structure 660 may be positioned at the central point of the second spiral structure 660. The second spiral structure 660 has a vertical projection on the second electrostatic-field enhancement element 680, and the whole vertical projection may be inside the second electrostatic-field enhancement element 680. The second nonconductive substrate 685 is disposed between the second spiral structure 660 and the second electrostatic-field enhancement element 680. The second spiral structure 660 may be affixed onto the second nonconductive substrate 685. The second via element 670 may penetrate though the second nonconductive substrate 685, and the second via element 670 may be coupled between the second spiral structure 660 and the second electrostatic-field enhancement element 680. To simplify the figure, the first nonconductive substrate 240 and the second nonconductive substrate 685 of FIG. 6 are represented by transparent elements. The second spiral structure 660, the second nonconductive substrate 685, and the second electrostatic-field enhancement element 680 may be substantially parallel to each other (similar to those of FIG. 2). The distance between the second spiral structure 660 and the second electrostatic-field enhancement element 680 (or the thickness of the second nonconductive substrate 685) may be shorter than 2 mm. Generally, the first spiral structure 110 and the second spiral structure 660 may be symmetrical with respect to a central line of the detection device 600. The connection element 690 may substantially has a straight-line shape. The connection element 690 is coupled between the first end 111 of the first spiral structure 110 and the first end 661 of the second spiral structure 660. That is, the connection element 690 is coupled between the first via element 120 and the second via element 670, such that the first spiral structure 110 and the second spiral structure 660 are both coupled to the proximity sensor 350. Since the first spiral structure 110 and the second spiral structure 660 share the proximity sensor 350, the detectable distance of the detection device 600 is significantly increased. In addition, a non-metal notch region 695 is defined by the first spiral structure 110, the second spiral structure 660, and the connection element 690. The non-metal notch region 695 may substantially have a rectangular shape. The whole vertical projection of the aforementioned antenna element 430 may be inside the non-metal notch region 695. Therefore, the radiation pattern of the antenna element 430 is not negatively affected by the detection device 600. Other features of the detection device 600 of FIG. 6 are similar to those of the detection devices 100, 200 and 300 of FIG. 1, FIG. 2 and FIG. 3. Accordingly, these embodiments can achieve similar levels of performance.

The invention proposes a novel detection device. According to practical measurements, the proposed detection device can increase its detectable distance by at least about 36% (e.g., from original 11 mm to 15 mm) even if the design space is limited by nearby components. Therefore, the corresponding mobile device has much higher probability of passing the SAR testing procedure.

Note that the above element sizes and element parameters are not limitations of the invention. A designer can fine-tune these settings or values according to different requirements. It should be understood that the detection device of the invention is not limited to the configurations of FIGS. 1-6. The invention may include any one or more features of any one or more embodiments of FIGS. 1-6. In other words, not all of the features displayed in the figures should be implemented in the detection device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. A detection device, comprising:
a first spiral structure, having a first end and a second end;
a proximity sensor, coupled to the first end of the first spiral structure;
a first via element;
a first electrostatic-field enhancement element, disposed adjacent to the first spiral structure, wherein the first end of the first spiral structure is coupled through the first via element to the first electrostatic-field enhancement element, the second end of the first spiral structure is an open end, and the first electrostatic-field enhancement element is configured to increase directivity of the detection device;
a first nonconductive substrate, disposed between the first spiral structure and the first electrostatic-field enhancement element, wherein the first via element penetrates though the first nonconductive substrates;
a second spiral structure, having a first end and a second end;
a second via element;
a second electrostatic-field enhancement element, disposed adjacent to the second spiral structure, wherein the first end of the second spiral structure is coupled through the second via element to the second electrostatic-field enhancement element, and the second end of the second spiral structure is an open end;
a second nonconductive substrate, disposed between the second spiral structure and the second electrostatic-field enhancement element, wherein the second via element penetrates though the second nonconductive substrate; and
a connection element, coupled between the first end of the first spiral structure and the first end of the second spiral structure;
wherein a non-metal notch region is defined by the first spiral structure, the second spiral structure, and the connection element, and a vertical projection of an antenna element is completely inside the non-metal notch region, such that a radiation pattern of the antenna element is not negatively affected by the detection device.

2. The detection device as claimed in claim 1, wherein the first electrostatic-field enhancement element is a first metal plane.

3. The detection device as claimed in claim 1, wherein a line width of the first spiral structure is from 0.3 mm to 0.5 mm.

4. The detection device as claimed in claim 1, wherein a distance between any two adjacent conductive lines of the first spiral structure is shorter than or equal to 0.3 mm.

5. The detection device as claimed in claim 1, wherein the first spiral structure is substantially parallel to the first electrostatic-field enhancement element, and a distance between the first spiral structure and the first electrostatic-field enhancement element is shorter than 2 mm.

6. The detection device as claimed in claim 1, wherein a vertical projection of the first spiral structure is completely inside the first electrostatic-field enhancement element.

7. The detection device as claimed in claim 1, wherein the second electrostatic-field enhancement element is a second metal plane.

* * * * *